United States Patent Office 3,282,320
Patented Nov. 1, 1966

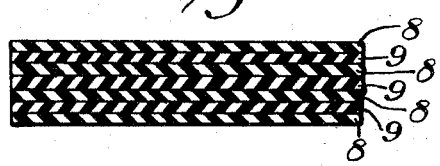
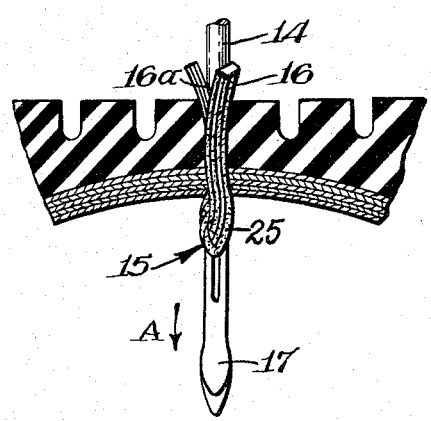
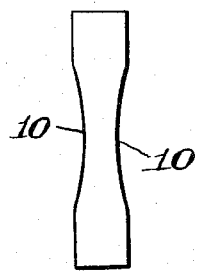
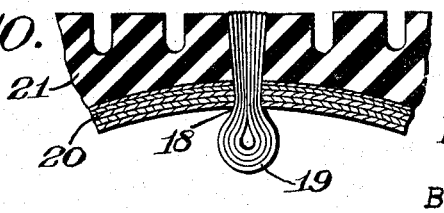

3,282,320
TIRE REPAIR PATCH
Eugen F. Klouza, New York, N.Y., assignor to German Stahlgruber Otto Gruber & Co., Munich, Germany, a company
Filed Mar. 8, 1965, Ser. No. 438,024
10 Claims. (Cl. 152—370)

The present invention relates to a tire repair patch, and more particularly to such a patch of the type which is inserted in the tire itself.

A recently developed tire repair patch or plug which is described in copending application Serial No. 299,977, filed August 5, 1963, now Patent No. 3,172,446, effectively repairs injured tires by providing for example a multi-ply patch including a vulcanizable layer which remains unvulcanized and plastic when inserted in the tire. This layer is secured to a vulcanized base layer, and another self-vulcanizing connecting layer is secured the other side of the base layer. The self-vulcanizing connecting layer includes for example sulfur or accelerators but lacks the necessary vulcanization component to cause this layer to become vulcanized. When the plug is inserted in the injured tire, the missing component is supplied by the user, and self vulcanization takes place to effectively secure the plug in place. The plug may also have five layers, with a central plastic layer bounded by a pair of base layers. The plug operates effectively, as pointed out in the aforementioned patent application because one layer always remains uncured and plastic. There is a possibility, however, that if the user does not follow instructions, and the missing vulcanizing agent or component is applied to the layer which is to remain plastic, that layer will also become vulcanized to frustrate the intended use of the patch.

An object of this invention is to provide a repair patch of the aforementioned type in which the plastic layer remains uncured. This differs from prior devices in which all of the self-vulcanizing layers must become vulcanized.

In accordance with this invention the uncured layer which is intended to remain plastic during use is bounded by already vulcanized layers. The patch is then secured in place in the injured tire adhesively instead of being self-vulcanized.

The patch advantageously may include a varying number of layers of alternatively arranged vulcanized and non-vulcanized layers. The patch may be rectangular in shape and may have a narrow indented portion to facilitate its insertion into the injured tire.

Novel features and advantages of the present invention will become apparent to one skilled in the art from a reading of the following description in conjunction with the accompanying drawings wherein similar reference characters refer to similar parts and in which:

FIG. 1 is a side view of a repair body according to this invention in its simplest form;

FIGS. 2–4 are modified forms of the embodiment of the invention shown in FIG. 1;

FIGS. 5 and 6 are alternative end views of the repair patch shown in FIG. 3;

FIG. 7 is an end view of still another form of this invention;

FIG. 8 is a plan view of one form of the repair patch shown in FIGS. 1–4;

FIG. 9 is a view partially in section of a punctured automobile tire and the inserted repair body according to the invention; and FIG. 10 is a view partially in section showing a fully repaired tire puncture according to this invention.

The repair body in its simplest embodiment is seen in FIG. 1 and is constructed of two layers of different components and structures which are tightly joined. The layer 1 consists of non-vulcanized caoutchouc containing neither sulfur, accelerators, nor other agents effecting the vulcanization. Thus there is no vulcanization of this layer even after the repair is completed. Layer 1 may however contain sulfur or accelerators but lacks a missing vulcanization component to also assure that this layer remains uncured and plastic after the repair is completed. Layer 2 is made of elastic vulcanized caoutchouc which acts as an effective support layer.

As represented in dotted lines, the repair body is folded in the center and inserted into the puncture of a damaged automobile tire by using a suitable tool, i.e. an awl or a kind of fork. The layer 2 consisting of vulcanized caoutchouc is then at the outside or exposed whereas the layer 1 being unvulcanized, remains unvulcanized and plastic, and stays inwardly in double volume.

The filling of the puncture is so complete that every place of the hole passage is filled with so much caoutchouc matter that there are no unfilled or insufficiently filled spaces. The pressure of the hole's walls can also squeeze portions of the non-vulcanized layer 1 into the spaces and fissures.

Where layer 1 is made of self-vulcanizing material, layer 2 can advantageously be made of a component which is such that a transfer of vulcanizing agents not consumed during vulcanizing is avoided. This assures that the vulcanizing agents missing from layer 1 would not migrate to that layer and make layer 1 vulcanized. Such a component for layer 2 is described in U.S. Patent No. 2,903,283. The repair body however is secured in the tire puncture by a conventional adhesive 25 (FIG. 9) which lacks the missing vulcanizing agents for layer 1 and thus further assures that this layer remains uncured and unvulcanized after the patch is completely in place.

The same effect of folding as shown in FIG. 1 can be achieved also by inserting several repair bodies simultaneously or one after another into the puncture.

The cross-section of the repair body can be rectangular because a puncture in the tire caused by a foreign body is almost never a round hole but is usually a flat tear or slit. The rectangular cross-section makes it easy to carry into effect this invention in such a manner that the pointed edges of the tear are included and sealed. However, the cross-section can also be simi-circular so that the folded repair body becomes somewhat cylindrical in form.

The repair body according to FIG. 2 consists of a central non-vulcanized plastic layer 3 bounded on both sides by a pair of vulcanized support layers 4, 4. Layers 3 and 4 correspond to layers 1 and 2 respectively which are shown in FIG. 1. A still further embodiment is shown in FIG. 3 in which the repair patch is of five-ply structure including a pair of non-vulcanized layers 5, a pair of outer vulcanized layers 6 and a central vulcanized layer 7. Due to this structure, it is not absolutely necessary to fold the repair body before the insertion in the tear or puncture. This kind of insertion can be useful because of the reasons mentioned later. The repair body according to FIG. 3 may have a rectangular or a round cross-section as shown in FIGS. 5 and 6 which would have no effect on the intended action of the combination of plastic and elastic layers.

In the embodiment according to FIG. 4 there are seven layers of alternately arranged vulcanized and unvulcanized caoutchouc 8, 9. Since the patch is secured in place by an adhesive which lacks the missing vulcanizing agents, the unvulcanized portions squeezed out remain non-vulcanized and plastic; thus layers 9 counteract the body's shrinking and hardening caused by ageing.

The repair bodies according to the invention are used in band form, especially when they have a rectangular cross-section. Advantageously, the individual layers have approximately a thickness of less than 1 mm. The inner non-vulcanized layers can be thicker than the vulcanized layer so that the plasticity has a favorable effect and also so that more plastic substance is squeezed out. In order to facilitate the adjustment of the tool for insertion into the punctures and to attain the desired stretching which is necessary at the insertion, because of reasons explained later on, the repair body can be provided with one or two notches or smaller indentations 10. These notches are shown in FIG. 8 which is a top view of the repair body in about its actual size.

The section shown in FIG. 7 represents a further modification of a repair body according to this invention. Here, non-vulcanized caoutchouc 11 supports embedded elements 12 in the form of strips or strands of vulcanized rubber. The nonvulcanized caoutchouc 11 is surrounded by a connecting layer 13 of vulcanized rubber so that the repair body can be secured in the tire puncture.

The insertion of the repair body according to the invention into a damaged tire is illustrated by FIGS. 9 and 10.

First of all the puncture is made slippery with a suitable tool such as an awl or fork and with a suitable tool such as an awl or fork and with adhesive. Thereupon a repair body is squeezed into the ear of the awl which is preferably open on one side only. The awl receives the repair body at its narrow point (indentations 10). Repair body and awl are coated with a suitable adhesive 25 which lacks the missing ingredient for producing vulcanization of the inner or plastic layer 1, 3, 5, 9 or 11. The repair body and awl may for example, be dipped into adhesive 25. When the awl 17 with the repair body is pressed into the tear passage of the tire, the repair body folds around the awl forming a pair of halves 16 and 16a. With the help of indentations 10 a relatively intense stretching of the repair body is therefore attained in axial direction A. The rubber substance gets so much smaller during the insertion that it is pressed tightly around the inserting tool. The volume threaded in this way through the passage is not too large; therefore the insertion is very easy and the already existing tears are not enlarged. The stretching affects in particular the part 15 that is not held by the wall of the tire and thereby the elastic vulcanized layers are especially stressed. With the removal of the tool, the part 15 snaps out of the ear of the tool and the contractions caused by the elastic layers enlarge the volume of the elastic layers which were previously stretched intensely. They also cause the plastic outer layers or portions being pressed from the inner plastic layers outwards to press against and into the wall of the puncture irrespective of its unevenness.

Furthermore, there is not only plastic and elastic filling in the hole passage, but a second sealing is created at the exit of the hole 18 in the inner tire by the plastic and elastic material. This second sealing is ball-shaped head 19 which settles at the hole exit at the inner wall of the tire thus forming the second seal against the penetration of compressed air into the cord layers 20. This ball-shaped head consisting of elastic and plastic material is secured so tightly at the inner wall of the tire respectively at the hole exit that it is not at all affected by the gyroscopic action of the operated tire. This pin head shaped inner seal intergrows and becomes in effect integral with the tire 21.

The multi-layer repair body according to this invention is also suitable for repairs on the sides where vulcanized rubber plugs, hollow bodies or rubber strips in particular would not be satisfactory. By its greater elasticity and its adaption capacity caused by the plastic component, the repair body remains fastened also in tires with thin walls and can withstand heavy pulling action. This also applies for the two-layer tires recently developed which have a very flexible thin walled carcass.

Obviously, many modifications and variations of the present invention are possible in the light of the above teachings. It is, therefore, to be understood that within the scope of the appended claims the invention may be practiced otherwise than as specifically described.

What is claimed is:

1. A tire repair body for repairing punctures in tires consisting of a pair of layers, said layers being a first layer of non-vulcanized material adapted to remain uncured and plastic after said body is inserted into the puncture of the tire, a second layer of vulcanized material joined to said non-vulcanized layer for supporting said non-vulcanized layer, and said layers being folded over with said vulcanized layer exposed and said non-vulcanized layer innermost.

2. A tire repair body for repairing punctures in tires comprising a layer of non-vulcanized material adapted to remain uncured and plastic after said body is inserted into the puncture of the tire, a layer of vulcanized material joined to said non-vulcanized layer for supporting said non-vulcanized layer, said layers being folded over with said vulcanized layer exposed and said non-vulcanized layer innermost, said body including adhesive means for securing it to the tire, and said adhesive means being self-vulcanizingly incompatible with said non-vulcanized layer whereby said non-vulcanized layer remains uncured and plastic.

3. A tire repair body for repairing punctures in tires consisting of a pair of outer vulcanized layers, an inner layer of non-vulcanized material, and said inner layer being adapted to remain uncured and plastic after said body is inserted into the puncture of the tire.

4. A tire repair body for repairing punctures in tires comprising a pair of outer vulcanized layers, at least one inner layer of non-vulcanized material, said inner layer being adapted to remain uncured and plastic after said body is inserted into the puncture of the tire, said body including adhesive means for securing it to the tire, said adhesive means being self-vulcanizingly incompatible with said non-vulcanized material whereby said non-vulcanized material remains uncured and plastic.

5. The tire repair body as set forth in claim 3 wherein said body has a substantially rectangular cross section, and said body having indented portions.

6. A tire repair body for repairing punctures in tires consisting of a pair of outer exposed layers of vulcanized material, at least two inner layers of non-vulcanized material adapted to remain uncured and plastic, and a vulcanized layer secured between each pair of non-vulcanized layers.

7. A tire repair body for repairing punctures in tires comprising a pair of outer layers of vulcanized material, at least two inner layers of non-vulcanized material adapted to remain uncured and plastic, a vulcanized layer secured between each pair of non-vulcanized layers, said body including adhesive means, and said adhesive means being self-vulcanizingly incompatible with said non-vulcanized material whereby said non-vulcanized material remains uncured and plastic.

8. A tire repair body for repairing punctures in tires comprising a cylindrical multi-layer plug, the exposed outer layer being of vulcanized material, the central layer being of non-vulcanized material which is adapted to remain uncured and plastic after said body is inserted into the puncture of the body, and vulcanized strands being embedded in said central layer of non-vulcanized material.

9. In a vehicle tire having an elongated slit extending completely therethrough, a tire repair body, said tire repair body comprising a layer of non-vulcanized uncured and plastic material, a layer of vulcanized material joined to said non-vulcanized layer for supporting said non-vulcanized layer, said body being folded and inserted in said slit with said non-vulcanized layer being disposed remote from the sides of said slit and said vulcanized layer being disposed toward said sides of said slit, adhesive means securing said body to said sides of said slit, an said adhesive means being self-vulcanizingly incompatible with said non-vulcanized layer.

10. In a vehicle tire having an elongated slit extended completely therethrough, a tire repair body, said tire repair body comprising at least one layer of non-vulcanized uncured and plastic material, each layer of said non-vulcanized material being bounded on both sides with a layer of vulcanized material, said body being inserted in said slit with said non-vulcanized material disposed remote from the sides of said slit and said vulcanized material being disposed toward said sides of said slit, adhesive means securing said body to said sides of said slit, and said adhesive means being self-vulcanizingly incompatible with said non-vulcanized material.

References Cited by the Examiner
UNITED STATES PATENTS

| | | | |
|---|---|---|---|
| 1,503,701 | 8/1924 | Morton et al. | 152—367 |
| 2,866,494 | 12/1958 | Sanderson | 156—97 |
| 2,966,189 | 12/1960 | Chambers et al. | 152—370 |
| 2,974,715 | 3/1961 | Soares et al. | 156—97 |
| 3,095,342 | 6/1963 | Kraly | 152—370 X |
| 3,172,446 | 3/1965 | Gruber | 152—370 |
| 3,174,525 | 3/1965 | Brose | 152—370 |

MILTON BUCHLER, *Primary Examiner.*

ARTHUR L. LA POINT, *Examiner.*

C. W. HAEFELE, *Assistant Examiner.*